Sept. 25, 1951  A. J. McMASTER ET AL  2,568,895
SLIDE PROJECTOR WITH COOLING FAN AND MOTOR ASSEMBLY
Filed Feb. 11, 1948  4 Sheets-Sheet 1
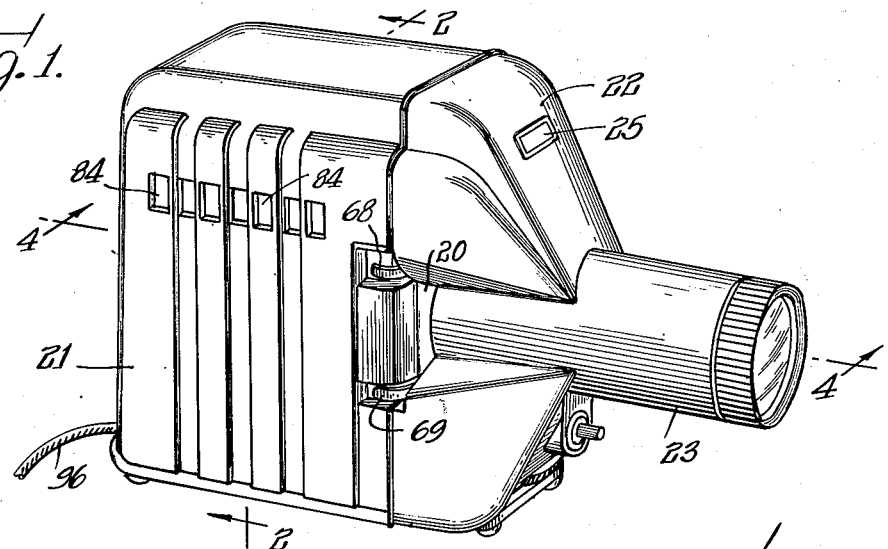
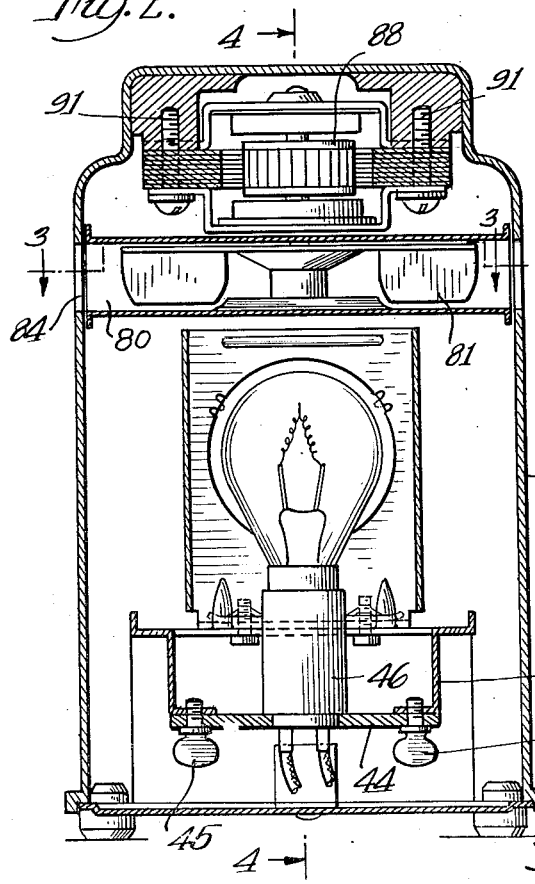
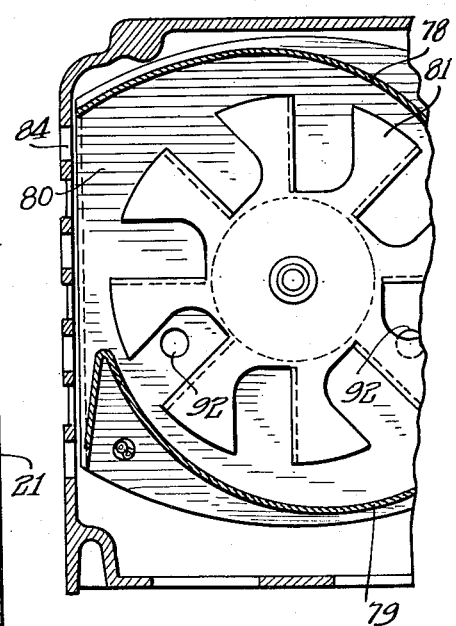
INVENTORS
Archie J. McMaster
William H. Kitto
By: McLaughlin & Weenstein
attys.

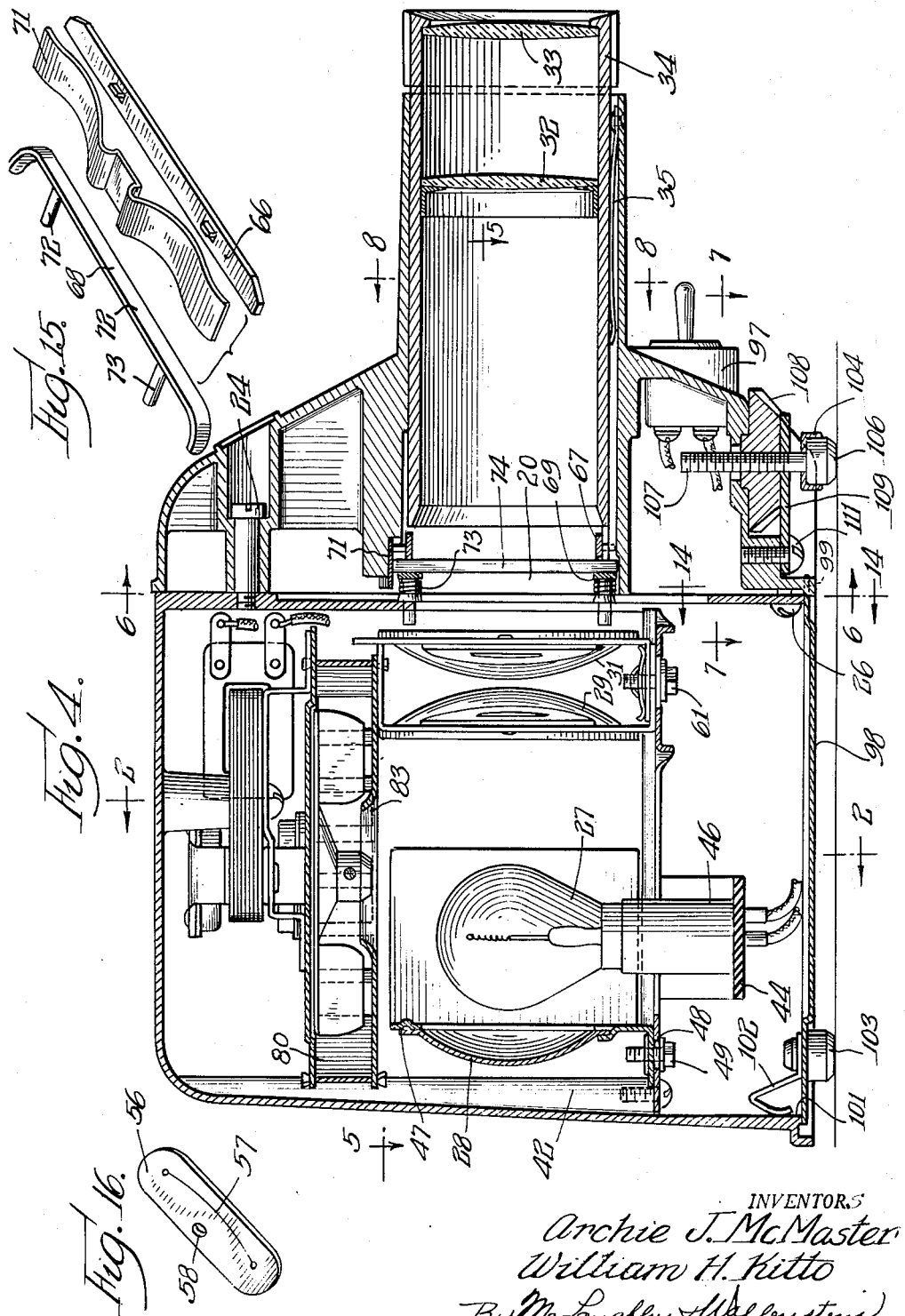

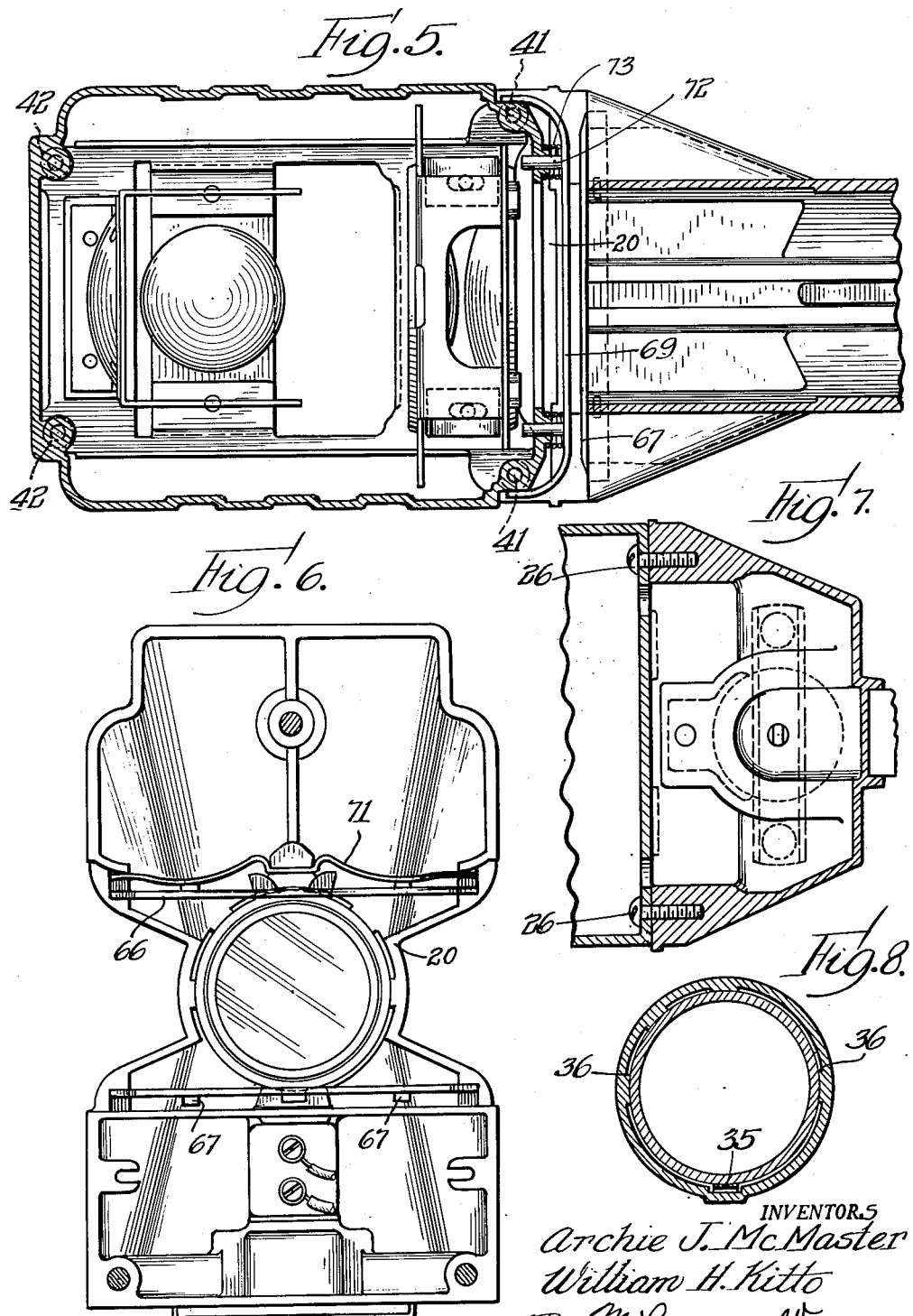

Sept. 25, 1951  A. J. McMASTER ET AL  2,568,895
SLIDE PROJECTOR WITH COOLING FAN AND MOTOR ASSEMBLY
Filed Feb. 11, 1948  4 Sheets-Sheet 4
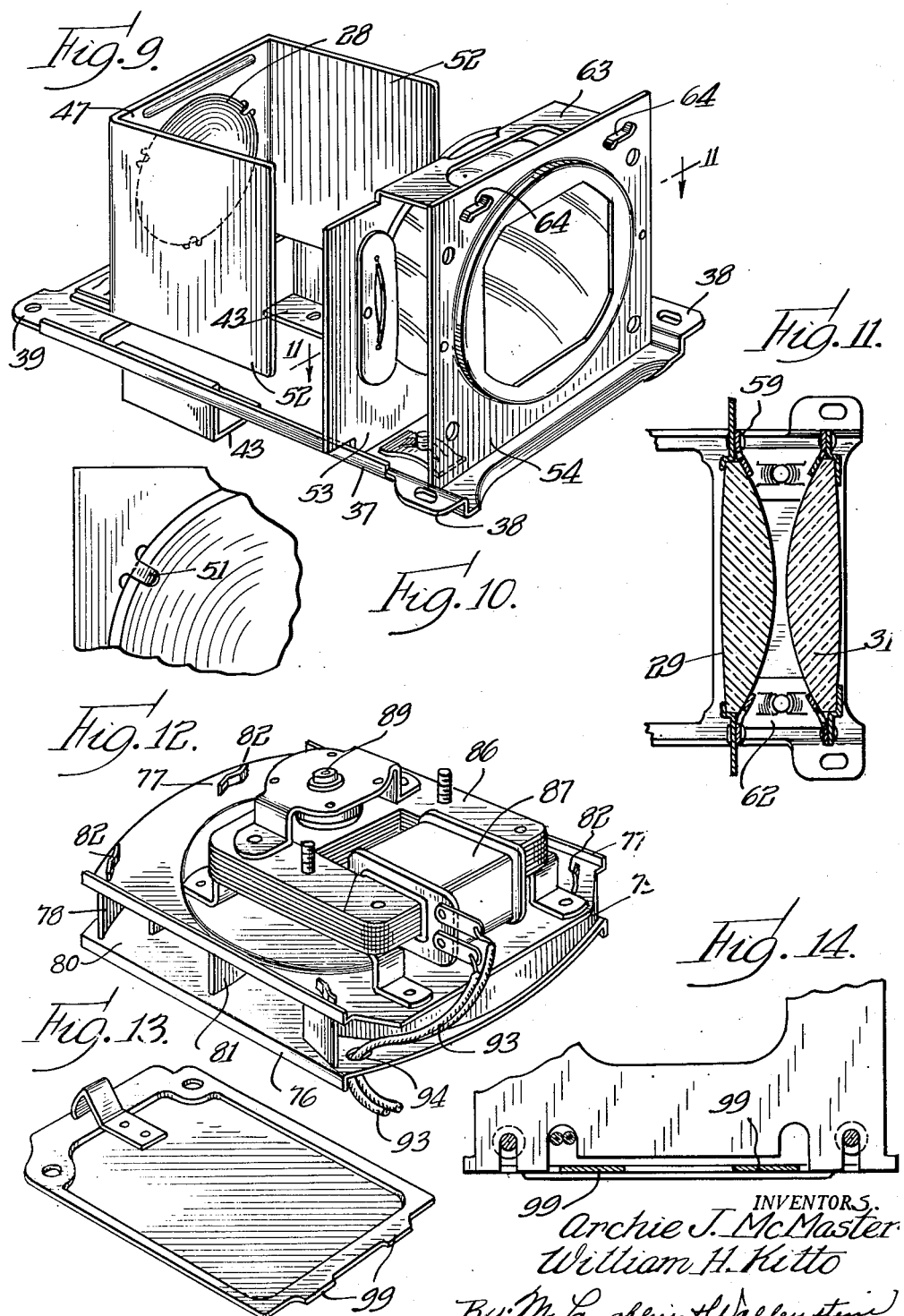

Patented Sept. 25, 1951

2,568,895

UNITED STATES PATENT OFFICE 2,568,895

SLIDE PROJECTOR WITH COOLING FAN AND MOTOR ASSEMBLY

Archie J. McMaster and William H. Kitto, Chicago, Ill., assignors to G-M Laboratories, Inc., Chicago, Ill., a corporation of Illinois Application February 11, 1948, Serial No. 7,636

9 Claims. (Cl. 88—24)

Our invention relates to an improved slide projector.

The invention is concerned more in particular with a slide projector for relatively small transparencies, such as the usual 35 mm. slides. In the form shown in the drawings it is intended for projecting bright images of intermediate magnification relatively short distances so that it can be operated in normal light. Many of the features of the invention, however, are capable of general use in the projector field.

Detailed objects and features of the invention will be brought out in connection with the detailed description which follows. The drawings show a preferred modification in which—

Fig. 1 is a perspective view;

Fig. 2 is a transverse sectional view taken on the line 2—2 of Fig. 1, looking in the direction of the arrows, the section line also appearing on Fig. 4, for clarity;

Fig. 3 is a fragmentary plan sectional view taken on the line 3—3 of Fig. 2;

Fig. 4 is a longitudinal sectional view taken on the line 4—4 of Fig. 2;

Fig. 5 is an irregular fragmentary plan section taken on the line 5—5 of Fig. 4;

Fig. 6 is a vertical transverse sectional view taken on the line 6—6 of Fig. 4 and shows the front casting in elevation;

Fig. 7 is a fragmentary plan sectional view taken on the line 7—7 of Fig. 4;

Fig. 8 is a sectional view through the lens tube taken on the line 8—8 of Fig. 4;

Fig. 9 is a perspective view of a condenser lens and reflector sub-assembly;

Fig. 10 is a fragmentary elevational view showing a portion of the reflector and the manner in which it is supported in position;

Fig. 11 is a sectional view taken on the line 11—11 of Fig. 9 and showing the lens mount;

Fig. 12 is a perspective view of the motor and blower assembly showing it removed from the projector housing;

Fig. 13 is a perspective view of the bottom plate assembly;

Fig. 14 is a fragmentary sectional view taken on the line 14—14 of Fig. 4 showing a lower portion of the main housing in elevation and illustrating the manner in which the bottom plate assembly is secured in position;

Fig. 15 is a perspective view showing some of the parts making up the slide carrier; and Fig. 16 shows one of the members forming a part of the lens mount.

The projector of our invention, as shown in the drawings, comprises a single piece rear housing 21 and front housing 22, the latter having an integral tube portion 23. The two housings are secured together by a single top screw 24 (see Fig. 4) and a plurality of screws 26 at the lower portion thereof. The slide supporting mechanism is disposed in an opening 20 between the two housings in a manner to be explained, the lens tube is supported by the housing 22, and the remaining portion of the projector, including the projector lamp, condenser lenses and cooling fan structure are disposed within the housing 21. The cooling arrangement is such that all of the air is drawn into the housing 21 through the opening between the two housings in contact first with the slide being projected, then into contact with the condenser lenses and from there is passed upwardly through a fan chamber 80 and discharged laterally near the top of the housing, all in a manner which will be fully explained.

The optical system comprises a lamp 27 (see Fig. 4), a mirror 28, condenser lenses 29 and 31, and objective lenses 32 and 33. The objective lenses are supported in a lens tube 34 which is slidably supported in the tubular portion 23 of the housing 22. The portion 23 has a longitudinal inner groove in which is disposed a leaf spring 35 so that the lens tube is slidably disposed within the portion 23 and the spring 35 provides enough friction to maintain it in any position to which it is adjusted. By adjusting the position of the lens tube, the projected image is focused on a screen disposed at some suitable distance in front of the projector. The portion 23 has a number of longitudinally disposed inner projections 36 which facilitate sliding of the tube and also have the advantage of facilitating removal of the casting from the mold.

The condenser lenses and remaining portions of the optical system comprise part of a sub-assembly as shown in Fig. 9.

The optical sub-assembly comprises a chassis 37 with projecting ears 38—38 and 39—39 for attachment to cast lugs 41—41 and 42—42, respectively (note Fig. 5). The chassis 37 also has integral therewith a pair of depending flanges 43 to which a base 44 is secured by thumb screws 45. The base 44 carries a socket 46 for the projection lamp 27.

The mirror 28 is inserted in a mirror bracket 47 turned under at 48 (Fig. 4) and secured to the chassis 37 by screws 49. The holes in the chassis through which the screws 49 project are slotted longitudinally (note Fig. 4) so that the position of the mirror bracket can be adjusted. The mirror is preferably of suitable polished metal and is set into the mirror bracket 47 in the manner particularly shown in Figs. 4, 9 and 10, with the integral lugs 51 supporting it in position. The mirror bracket 47 has right angular side projections 52 which extend forwardly and partially enclose the projection lamp.

The condenser lenses 29 and 31 are supported in rear and front lens brackets 53 and 54, respectively. Each of the lens brackets is apertured and is provided with an annular recessed ledge, as shown particularly in Fig. 11, into which a portion of the lens near the periphery engages. The lenses are secured in position by specially shaped lens mounting members 56, as shown particularly and in full in Fig. 16, but indicated, also, in Figs. 4, 9 and 11. The mounting members 56 are completely cut through along a line or slit 57 and have a mounting hole 58 for attachment by means of a rivet 59 to the lens mounting brackets with which they are associated. Thus, the lens mounting members are secured at one side of the slits 57 and engage the lenses at the opposite side of the slits 57 so that a resilient mounting results. The members 56 are suitably formed of Phosphor bronze, or other suitable resilient material. This mounting means not only provides for resiliency so that the lenses are able to withstand considerable shock without breaking but it also provides an automatic adjustment in the mounting structure for differences in lens thickness.

The lens mounting brackets 53 and 54 have lower right angular portions as shown particularly in Fig. 4 and are secured together to the chassis by means of machine screws 61 and suitable nuts 62. The holes in the chassis through which screws 61 extend are slotted longitudinally (see Fig. 4) so that the position of the lens brackets can be adjusted. At the top, the lens brackets are firmly supported, with respect to each other, by means of a right angular forward projection 63, two tabs 64 of which extend through slots in the front lens bracket and are deformed for attachment in the manner shown in Fig. 9. Thus the two condenser lenses are supported so as to occupy fixed relative positions with respect to each other.

As previously noted, the slide carrier is disposed in an opening 20 between the housing 21 and housing 22 and communicating with the interior of the housing 21. The slide carrier in the opening 20 comprises upper and lower slide bars 66 and 67 carried by the housing 22, top and bottom horizontal pressure pads 68 and 69 carried by the housing 21 and a vertical pressure pad 71 carried by the housing 22. The horizontal pressure pads have integral pins 72 slidably projecting into openings in the rear housing 21, and compression springs 73 coiled around the pins 72 continuously force them in the direction of a slide 74. The slide bars 66 and 67 are supported in position by merely having their ends wedged into recessed portions of the front housing 22 as shown in Fig. 6. The vertical pressure pad 71 comprises a relatively thin formed sheet spring member supported at its center by specially formed lugs on the front housing 22, as shown particularly in Fig. 6. The bars 66 and 67 and the vertical pressure pad 71 are also further supported against dislodgment by the attachment of the two housings together, the contiguous portion of the rear housing and the horizontal pressure pads having the effect of holding the vertical pressure pad and bars 66 and 67 in position. The horizontal pressure pads 68 and 69 hold the slides forwardly against the bars 66 and 67 to space the slides forwardly of the rear housing 21 in the opening 20 so that cooling air sweeps across the slides in the opening 20 as it enters the rear housing 21. As shown particularly in Figs. 5 and 15 (note also Fig. 1), the horizontal pressure pads and slide bars are rounded at their outside edges to facilitate introduction of a slide. They are so dimensioned with respect to slides which are to be used in a machine that with a slide in projecting position two additional slides may also be engaged at the sides of the slide being projected. Thus, a slide may be pushed in with the fingers, and a slide partially inserted from the side ready for projection. When the slide in projection position has been shown a sufficient time, the two slides are moved through the slide carrier and the ejected slide is retained by the slide carrier until the same is removed manually.

The cooling fan and motor comprise a subassembly as shown in perspective in Fig. 12. This assembly comprises a lower plate 76 and an upper plate 77 within which are disposed spacers 78 and 79. These four members are secured together to form a fan chamber 80 for a fan 81. Suitably the securing means comprises ears 82 on the spacers 78 and 79 which project through slits in the upper and lower plates and are deformed for permanent assembly. The lower plate 76 is apertured as at 83 (see Fig. 4) so that air is delivered to the fan through such opening 83; and the spacers 78 and 79 are so shaped as to provide the fan chamber 80 with only side outlets communicating with the housing openings 84, as shown particularly in Figs. 2 and 3, so that the effluent air is discharged sideways through housing openings 84.

We employ a suitable relatively small synchronous motor such as shown in Stewart et al. Patent No. 1,822,679, and having a stack of laminations 86, coil 87 and rotor 88 secured to shaft 89. The fan 81 is suitably secured to the shaft 89 to rotate with the fan. The motor fan assembly is secured to lugs at the uppermost portion of the rear housing by means of machine screws 91, and suitably aligned apertures 92 in the top and bottom plates permit the introduction of a suitable tool for tightening the screws. Conductors 93 pass through an aperture 94 in the lower plate 76 and down into the interior portion of the rear housing 21 for connecting into the electrical circuit of which the projection lamp forms a part.

A conductor 96 is adapted to connect to a suitable source of power and has one of its leads running to a switch 97 mounted in a formed portion of the front housing. By connecting the other lead to one of the conductors from the motor and from the projection lamp, and connecting the remaining two conductors from the motor and projection lamp to the opposite side of the switch 97, a circuit is established in which the switch 97 controls both the projection lamp and motor.

The bottom of the rear housing is normally open but is adapted to be closed by a bottom plate 98. This plate has a pair of projections 99 which extend under a slightly shortened portion of the front wall of the housing 21, but engage over the top of a flanged portion of the housing 22. The rear portion of the bottom plate engages flush against a seat 101 of the rear housing 21, and a latch spring 102 frictionally holds the bottom 98 in the position shown in Fig. 4. The bottom plate is, therefore, brought into position by first inserting the projections 99 and then forcing the rear portion of the bottom plate upwardly until the seat 101 is engaged and the latch spring 102 occupies the position shown in the drawings. The rear portion of the bottom plate carries a pair of rubber feet 103 which accurately position the rear portion of the projector with respect to any surface on which it may be supported.

At the front of the projector and associated with the front housing 22 we provide a height adjusting screw assembly as shown particularly in Figs. 1, 4, 6 and 7. A bracket 104 carries two rubber feet 106 and an upwardly projecting integral screw 107 on which a specially shaped nut 108 is threaded. A nut holder 109 is secured to the housing by a screw 111. The screw 107 is made out of round so that it will not turn with respect to the nut holder 109 and the bracket 104 will always be maintained in a transverse position. There is sufficient flexibility between all of the parts so that the bracket 104 has a self-leveling function so far as the projector is concerned and the height of the feet is determined by the relative position of the nut 108 and the screw 107.

The projector of our invention is relatively simply formed and may be assembled in a simple manner. The two housings are preferably die castings requiring no machining whatsoever. They are secured together with the three screws 24, 26—26, previously referred to, and the opening providing access to the screw 24 may be closed, as by the use of a name plate 25, so that in the finished projector the housing is substantially unbroken at this point as appears clear from Fig. 1. This expedient has the advantage of improving the design and also preventing purchasers from tampering with the final assembly. The screws 26 are preferably provided with Phillips heads or the like so that factory assembly is facilitated, but tampering by purchasers is made less feasible.

The fan and motor sub-assembly and optical sub-assembly are introduced into the housing 21 as a unit. The relative positions of the lamp, mirror and two condenser lenses are important so they are made as tamper-proof as possible while still furnishing sufficient access for dismantling and lens cleaning, if and when necessary. Taking the optical sub-assembly out as a unit avoids the possibility of faulty optical adjustment on re-assembly.

When the projector is in use, the motor and fan will necessarily be operated during the entire time that the projection lamp is lit. When a slide is introduced, therefore, all of the air delivered to the fan must pass the slide through the opening 20 so that cooling of the slide is continuous. We find that it is unnecessary to use heat filters or other devices to prevent overheating of a slide. After the air passes the slide in the opening 20, it comes first into contact with the condenser lenses and then into contact with remaining portions of the apparatus including the projection lamp. It is drawn into the fan chamber 80 through central opening 83 and is discharged through the two side openings in the fan chamber 80 and out through the housing opening 84. Thus the air makes a turn of 90 degrees and is discharged through a path which cannot be followed at least by any direct or intense light. The horizontal discharge of the air not only prevents excessive undesirable light reflection but, also, moves the discharged air in a direction away from the operator. We have found that even after long operation, the projector will not reach a sufficiently high temperature to be unsafe.

The slightly resilient lens mounting which we employ prevents possible breakage of the lenses which can occur because of shipping shocks but at the same time assures holding the lenses in proper position so that there will be no change in adjustment. Allowance is also made for different lens thickness as well as differential expansion and contraction of glass and metal. The lens mount also provides a mask to frame the lighted portion of the screen when there is no slide in position on the projector. The lens positions and reflector positions are adjustable to permit proper focusing for assembly and adjusting purposes, but, as pointed out, the sub-assembly is arranged so that no change of adjustment occurs during ordinary servicing.

Height of the projected picture is readily controlled during projection by means of the nut 108 and associated parts as shown particularly in Fig. 4. It will be noted that this nut is formed with a generally conical rim, somewhat like a bevel gear. When finger pressure is applied to this rim to rotate the nut, the resulting vertical component of the pressure exerted acts to relieve the dead weight of the projector, and the screw thread system is thus easier to rotate. Height adjustment can, therefore, readily be made with one hand and there is a lessened tendency to swing the projector about a pivot at or near the rear feet thereof.

What we claim as new and desire to protect by Letters Patent of the United States is:

1. A projector of the character described comprising adjoining rear and front housings, the latter having a tubular portion, a lens tube adjustably disposed in said tubular housing portion, a fan and motor assembly supported within the rear housing at the top thereof and including a fan chamber communicating with the interior of the rear housing, an optical sub-assembly supported within the rear housing, and including aligned projection lamp, mirror reflector and condenser lenses, and slide carrier means between the front and rear housings in alignment with the optical sub-assembly, the rear housing having air discharge vents near the top thereof in communication with the fan chamber, and the rear housing being otherwise substantially closed, so that air is forced by the fan and motor assembly to enter around a slide supported in said slide carrier means, and into contact with the condenser lenses.

2. A projector of the character described comprising adjoining rear and front housings, means associated with the front housing for supporting an objective lens, a fan and motor assembly supported within the rear housing at the top thereof and including a fan chamber communicating with the interior of the rear housing, an optical sub-assembly supported within the rear housing, and including aligned projection lamp, mirror reflector and condenser lenses, and means between the front and rear housings for supporting a slide, the rear housing having air discharge vents near the top thereof in communication with the fan chamber, and the rear housing being otherwise substantially closed, so that air is forced by the fan and motor assembly to enter around a slide in the slide supporting means and passes into the rear housing for cooling the same.

3. A projector of the character described comprising rear and front housings, the latter having a tubular portion, a lens tube adjustably disposed in said tubular housing portion, a fan and motor assembly supported within the rear housing at the top thereof, an optical sub-assembly supported within the rear housing, and including aligned projection lamp, mirror reflector and condenser lenses, and slide carrier means between the front and rear housings, the rear housing having air discharge vents near the top thereof, and the rear housing being otherwise substantially closed, said slide carrier means including horizontal and vertical pressure pads, and horizontal rails against which the slides engage, the said pads and rails being arranged whereby to space the slides and provide the only air access to the housing around the slides.

4. A projector of the character described, comprising a housing having air vents at the sides near the top thereof, an optical system disposed in the housing, said optical system including a system of lenses and a projection lamp, means for supporting a slide in projection position, a motor at the top of the housing, a fan driven by the motor and disposed in a fan chamber having exhaust ports in alignment with the air vents in the housing, and an intake port communicating with the portion of the housing containing the condenser lenses, the cooling air being thereby exhausted sidewise at 90° from point of ingress into the fan chamber, so that there is no direct emission of light through the housing exhaust vents.

5. A projector of the character described comprising rear and front housings removably connected to each other, the latter housing having a tubular portion, a lens tube adjustably disposed in said tubular housing portion, a fan and motor assembly supported within the rear housing at the top thereof, said fan being horizontally disposed and supported for rotation upon a vertical shaft, an optical sub-assembly supported within the rear housing, and including aligned projection lamp, mirror reflector and condenser lenses, and slide carrier means between the front and rear housings, the rear housing having air discharge vents at opposite sides and near the top thereof, and the rear housing being otherwise substantially closed, so that cooling air is forced initially to enter around a slide supported in said slide carrier means, thence into contact with the condenser lenses, and thence upwardly through the fan and out through said discharge vents.

6. A projector of the character described comprising rear and front housings, means associated with the front housing for supporting an objective lens, a fan and motor assembly supported within the rear housing at the top thereof, said fan being horizontally disposed and supported for rotation upon a vertical shaft, an optical sub-assembly supported within the rear housing, including aligned projection lamp, mirror reflector and condenser lenses, and means between the front and rear housings for supporting a slide, the rear housing having air discharge vents at opposite sides and near the top thereof, and the rear housing being otherwise substantially closed, so that cooling air is forced initially to enter around a slide supported in said slide supporting means, thence into contact with said condenser lenses, and thence upwardly through the fan and out through said discharge vents.

7. In a projector of the character described, a housing having an electric motor at the top thereof and a fan below the motor, said fan being horizontally disposed and supported for rotation upon a vertical shaft, a centrally apertured fan chamber having its only outlets at the sides in alignment with openings at the upper part and in the sides of the housing, means forming an optical projection system including condenser lenses, said optical projection system being disposed below the fan, and slide supporting means aligned with the optical system, the housing being substantially closed except at the slide and at said side openings, so that cooling air is drawn into the housing across the face of a slide being projected, thence into contact with said condenser lenses, and thence upwardly through the fan and out of the housing through said side openings.

8. A projector of the character described, comprising a housing having air vents at the sides near the top thereof, an optical system disposed in the housing, said optical system including a system of lenses and a projection lamp, means for supporting a slide in projection position, a motor at the top of the housing, a fan mounted for rotation on a vertical shaft and driven by the motor and disposed in a fan chamber having exhaust ports in alignment with the air vents in the housing, and an intake port communicating with the portion of the housing containing the condenser lenses, the cooling air being thereby exhausted sidewise at approximately 90 degrees from point of ingress into the fan chamber, so that there is no direct emission of light through the housing exhaust vents.

9. A projector of the character described comprising an enclosed housing having only a front opening and side openings, an optical projection system including aligned projection lamp, mirror reflector and condenser lenses within the housing and in alignment with the front opening for projecting light therethrough, slide supporting means at the front of the housing for supporting a slide in front of and spaced forwardly from the front opening in the housing for projecting an image from the slide and providing an air passage between the slide and housing into the front opening of the housing, and a fan and motor assembly in the housing above the optical system and having a fan chamber communicating with the housing interior and the side openings in the housing for drawing air across the slide and through the front opening into the housing, for passing the air over the optical projection system and for discharging the air through the housing side openings.

ARCHIE J. McMASTER.
WILLIAM H. KITTO.

REFERENCES CITED

The following references are of record in the file of this patent:

UNITED STATES PATENTS

| Number | Name | Date |
|---|---|---|
| 952,199 | James | Mar. 15, 1910 |
| 1,233,407 | Schwanhausser | July 17, 1917 |
| 1,598,444 | Howell | Aug. 31, 1926 |
| 1,849,151 | Ott | Mar. 15, 1932 |
| 1,880,414 | Capstaff | Oct. 4, 1932 |
| 1,919,595 | Owens | July 25, 1933 |
| 1,937,379 | Berg | Nov. 28, 1933 |
| 1,962,356 | Mihalyi | June 12, 1934 |
| 1,966,531 | Tint | July 17, 1934 |
| 2,165,681 | Stechbart | July 11, 1939 |
| 2,194,366 | Ott | Mar. 19, 1940 |
| 2,292,966 | Osterberg et al. | Aug. 11, 1942 |
| 2,298,369 | Greaves | Oct. 13, 1942 |
| 2,344,263 | Perkins | Mar. 14, 1944 |